United States Patent
Drexl et al.

(10) Patent No.: US 10,222,784 B2
(45) Date of Patent: Mar. 5, 2019

(54) METHOD FOR CONTROLLING A DEVICE SYSTEM, WHICH COMPRISES A TOOL DEVICE AND MOTORIZED ADVANCING APPARATUS

(71) Applicant: Hilti Aktiengesellschaft, Schaan (LI)

(72) Inventors: Tobias Drexl, Weil (DE); Ralf Pfeiffer, Landsberg (DE); Roland Schaer, Grabs (CH); Dieter Profunser, Zwischenwasser (AT)

(73) Assignee: Hilti Aktiengesellschaft, Schaan (LI)

( * ) Notice: Subject to any disclaimer, the term of this patent is extended or adjusted under 35 U.S.C. 154(b) by 24 days.

(21) Appl. No.: 15/106,392

(22) PCT Filed: Dec. 17, 2014

(86) PCT No.: PCT/EP2014/078126
§ 371 (c)(1),
(2) Date: Jun. 20, 2016

(87) PCT Pub. No.: WO2015/091592
PCT Pub. Date: Jun. 25, 2015

(65) Prior Publication Data
US 2016/0370794 A1      Dec. 22, 2016

(30) Foreign Application Priority Data
Dec. 20, 2013  (DE) .................................. 131 99 045

(51) Int. Cl.
*G05B 19/042*  (2006.01)
*G05B 19/4093* (2006.01)
*G05B 19/416*  (2006.01)

(52) U.S. Cl.
CPC ..... *G05B 19/40938* (2013.01); *G05B 19/042* (2013.01); *G05B 19/4166* (2013.01);
(Continued)

(58) Field of Classification Search
CPC ............ G05B 19/042; G05B 19/40938; G05B 2219/35519; G05B 2219/37583
See application file for complete search history.

(56) References Cited

U.S. PATENT DOCUMENTS

| | | | | |
|---|---|---|---|---|
| 4,822,215 A | * | 4/1989 | Alexander ............. | B23Q 11/04 318/433 |
| 9,333,563 B2 | | 5/2016 | Uchiuzo et al. | |

(Continued)

FOREIGN PATENT DOCUMENTS

| | | |
|---|---|---|
| EP | 0 343 623 A2 | 11/1989 |
| EP | 1 988 438 A2 | 11/2008 |

(Continued)

OTHER PUBLICATIONS

Japanese-language Office Action issued in counterpart Japanese Application No. 2016-540971 dated Apr. 28, 2017 with English translation (four (4) pages).

(Continued)

*Primary Examiner* — Mark A Connolly
(74) *Attorney, Agent, or Firm* — Crowell & Moring LLP (57) ABSTRACT

A method for controlling a device system is disclosed, and the device system includes a tool device and a motorized advancing apparatus during the machining of a workpiece composed of a first material and a second material different from the first material. The method includes machining the workpiece by the device system initially in a first operating mode with first machining parameters that are stored for the first material. After the start of the machining of the workpiece in the first operating mode, the method includes measuring and storing a first machining progress of the tool device as a reference value. During the machining of the workpiece in the first operating mode, the method also includes regularly measuring and comparing with a first (Continued)

threshold value a current machining progress of the tool device.

5 Claims, 5 Drawing Sheets

(52) U.S. Cl.
CPC .............. *G05B 2219/35519* (2013.01); *G05B 2219/37583* (2013.01); *G05B 2219/45148* (2013.01); *G05B 2219/49088* (2013.01); *G05B 2219/49097* (2013.01)

(56) References Cited

U.S. PATENT DOCUMENTS

| | | | | |
|---|---|---|---|---|
| 2003/0063291 | A1* | 4/2003 | Bloch | G01B 11/026 356/601 |
| 2005/0230130 | A1* | 10/2005 | Strasser | B25F 5/00 173/2 |
| 2008/0184806 | A1* | 8/2008 | Valentini | G01N 3/42 73/788 |
| 2009/0129877 | A1* | 5/2009 | Brady | B23B 35/00 408/16 |
| 2010/0025107 | A1* | 2/2010 | Merkley | B23B 35/00 175/24 |
| 2010/0221071 | A1* | 9/2010 | Hinshaw | E21D 20/003 700/275 |
| 2015/0218928 | A1* | 8/2015 | Suvanen | E21B 43/30 700/275 |
| 2015/0293518 | A1* | 10/2015 | Ramiere | G05B 19/182 700/168 |

FOREIGN PATENT DOCUMENTS

| | | |
|---|---|---|
| EP | 2 591 870 A1 | 5/2013 |
| JP | 3-27908 A | 2/1991 |
| JP | 2012-16793 A | 1/2012 |
| WO | WO 2009/117836 A1 | 10/2009 |

OTHER PUBLICATIONS

PCT/EP2014/078126, International Search Report (PCT/ISA/210) dated Feb. 16, 2015, with partial English translation (Five (5) pages).

* cited by examiner

METHOD FOR CONTROLLING A DEVICE SYSTEM, WHICH COMPRISES A TOOL DEVICE AND MOTORIZED ADVANCING APPARATUS

This application claims the priority of International Application No. PCT/EP2014/078126, filed Dec. 17, 2014, and European Patent Document No. 13199045.9, filed Dec. 20, 2013, the disclosures of which are expressly incorporated by reference herein.

BACKGROUND AND SUMMARY OF THE INVENTION

The present invention relates to a method for controlling a device system, which includes a tool device and a motorized advancing apparatus, during the machining of a workpiece composed of a first material and a second material different from the first material.

With respect to machining tool devices, various materials that are to be machined, for instance concrete and steel, require adjusted machining parameters. The machining parameters adjusted to the respective material differ strongly from one another due to the various material properties of concrete and iron. The machining parameters include not only a suitable machining tool, but also, for instance, torque and rotational speed with which the machining tool is driven around an axis of rotation.

In order to take advantage of the available power of the tool device and at the same time reduce wear and tear on the machining tool, it is known that the operator will adjust the machining parameters of the tool device to the machining tool and the material of the workpiece. For core bore devices, for instance, the parameters of the drive motor, especially the power and the rotational speed, are set as a function of the diameter of the core bore bit. The disadvantage is that an inexperienced operator does not have the necessary knowledge to adjust the machining parameters of the tool device to various materials. In addition, it is frequently not known where reinforcing bars are located.

From EP 1 988 438 A1 is known a method for controlling a device system consisting of a device stand, a tool device, and a motorized advancing apparatus as well as a corresponding device system for executing the method. The tool device includes a drive motor for driving a machining tool, a sensor apparatus for measuring the motor output, and a control unit for controlling the tool device. The motorized advancing apparatus includes, among other things, an advancing motor and a control unit for controlling the motorized advancing apparatus. A known control method has the disadvantage that the control of the overall device system takes place exclusively on the basis of the motor output or a measurement value functionally dependent on the motor output. The advancing speed is determined from the motor output. The motor output and the advancing speed determined from it serve to estimate the tool parameters (bore bit diameter) and workpiece parameters (height of the workpiece and concrete or iron). On the basis of the estimated tool and workpiece parameters, target values are determined for the rotational speed and the motor output of the drive motor while using lookup tables containing know-how about the machining method.

The present invention, in contrast, consists of further developing a method for controlling a device system which includes a tool device and a motorized advancing apparatus so that the machining parameters are adjusted to the properties of the workpiece to be machined and the machining process for core boring is largely automated.

This task will be accomplished for the aforementioned method for controlling a device system, which includes a tool device and a motorized advancing apparatus according to the invention.

In accordance with the invention, a method for controlling a device system, which includes a tool device and a motorized advancing apparatus, during machining of a workpiece composed of the first material and a second material different from the first material, is disclosed. The workpiece is machined by the device system initially in a first operating mode with first machining parameters that are stored for the first material. After the start of the machining of the workpiece in the first operating mode, a first machining progress of the tool device is measured and stored as a reference value. During machining of the workpiece in the first operating mode, a current machining progress of the tool device is regularly measured and compared with a first threshold value.

The present invention relates to the machining of workpieces that consist of various materials. The workpieces exhibit at least two different materials that are referred to as the first and the second material and that differ from each other in their material properties. The material located at the surface of the workpiece is referred to as the first material. The combination of materials most important for core boring is concrete as the first material and iron as the second material, whereby iron is embedded in the concrete in the form of reinforcing bars.

A prerequisite condition for the method according to the invention is that the device system knows the materials of which the workpiece to be machined consists and which material is located on the surface of the workpiece. For various materials, appropriate machining parameters are stored in the device control of the device system, first machining parameters for the first material and second machining parameters for the second material. The stored machining parameters are based on a variety of bores and are stored in the form of lookup tables in the device control. The machining parameters stored in the device control can be optimized with respect to various basic conditions such as the frequently applied basic conditions include high machining speed, low tool wear, and high machining quality.

In order to be able to automatically control the device system which includes the tool device and the motorized advancing apparatus, the device system must recognize whether the bore bit is machining the first material of the workpiece or the second material of the workpiece. With respect to the control method according to the invention, it is assumed that the workpiece at the surface consists of the first material. Therefore, the device system is initially machined in a first operating mode with first machining parameters that are stored for the first material. After the start of machining in the first operating mode, a first machining progress is measured and stored as a reference value. As a bore progress, a quotient made up of a path difference and a time difference is defined which therefore represents a speed. The bore progress thus can be calculated so that the positions of the bore bit are measured or the necessary time is measured for preset positions of the bore bit at the start and at the end of a fixed time interval.

Machining in the first operating mode starts at a time when it is ensured that the first material is machined. The decision of whether the bore bit will machine the first material or the second material is made with the assistance of the bore progress. During machining of the workpiece in the first operating mode, a current machining progress of the tool device is regularly measured and compared with a first threshold value. The first threshold value, like the machining parameters, is based on a number of bores and is stored in the device control. The first threshold value includes the various material properties of the first and second material.

The workpiece is further machined by the device system in the first operating mode when the current machining progress is within the first threshold value. Because the first material is not homogenous, smaller deviations of the current machining progress from the reference value are permitted. As long as the deviations are smaller than a permitted deviation, the machining will take place with the device system in the first operating mode.

The device system is switched from the first operating mode to a second operating mode when the current machining progress is outside the first threshold value, whereby the workpiece is machined by the device system in the second operating mode with second machining parameters that are stored for the second material. Because the properties of the first and second materials differ strongly from each other, there is a dramatic change in the current machining progress when the bore bit machines the second material. This change in the current machining progress is used to switch from the first operating mode to the second operating mode.

In a first embodiment, the first threshold value is smaller than the reference value. The workpiece is machined in the first operating mode as long as the current machining progress is less than the first threshold value. When the current machining progress is less than the first threshold value, the device system is switched from the first operating mode to the second operating mode.

In a second embodiment, the first threshold value is more than the reference value. The workpiece is machined in the first operating mode as long as the current machining progress does not exceed the first threshold value. When the current machining progress exceeds the first threshold value, the device system is switched from the first operating mode to the second operating mode.

During machining of the workpiece in the second operating mode, the current machining progress of the tool device is regularly measured and compared with a second threshold value. The second threshold value, like the machining parameters and the first threshold value, is based on a number of bores and is stored in the device control.

The workpiece is further machined by the device system in the second operating mode when the current machining progress is within the second threshold value. Because the second material is not homogenous, smaller deviations of the current machining progress are permitted. As long as the deviations are less than a permitted deviation, machining takes place with the device system in the second operating mode.

The device system is switched from the second operating mode to the first operating mode when the current machining progress is outside the second threshold value, whereby the workpiece is machined by the device system in the first operating mode with the first machining parameters that are stored for the first material.

In the first embodiment in which the first threshold value is less than the reference value, the second threshold value is greater than the first threshold value. The workpiece is machined by the device system in the second operating mode as long as the current machining progress does not exceed the second threshold value. The device system is switched from the second operating mode to the first operating mode when the current machining progress exceeds the second threshold value.

In the second embodiment in which the first threshold value is greater than the reference value, the second threshold value is less than the first threshold value. The workpiece is further machined by the device system in the second operating mode if the current machining progress does not exceed the second threshold value. The device system is switched from the second operating mode to the first operating mode when the current machining progress is less than the second threshold value.

The method according to the invention can be applied to workpieces having more than two materials. A prerequisite condition is that for each material suitable machining parameters are stored and there are corresponding threshold values that represent the transition between two materials.

Embodiments of the invention are described below by way of the drawing. The drawings are not necessarily meant to represent the embodiments to scale but rather, the drawings, where useful for explanatory purposes, are provided in a schematic and/or slightly distorted form. With respect to additions to the teachings directly discernible from the drawing, reference is made to the relevant prior art. Here it is important to note that a variety of modifications and changes can be made with regard to the form and detail of an embodiment without deviating from the general idea of the invention. The features of the invention disclosed in the description and/or the drawing can be essential individually as well is in any combination for refining the invention. In addition, all combinations of at least two of the features disclosed in the description and/or the drawing fall within the bounds of the invention. The general idea of the invention is not limited to the exact form or the detail of the preferred embodiments shown and described below. For given measurement areas, values within the stated limits are to be disclosed as threshold values and arbitrarily usable. In the interests of simplicity, the same reference numbers are used below for identical or similar parts or parts with identical or similar function.

DETAILED DESCRIPTION OF THE DRAWINGS

Figure 1:
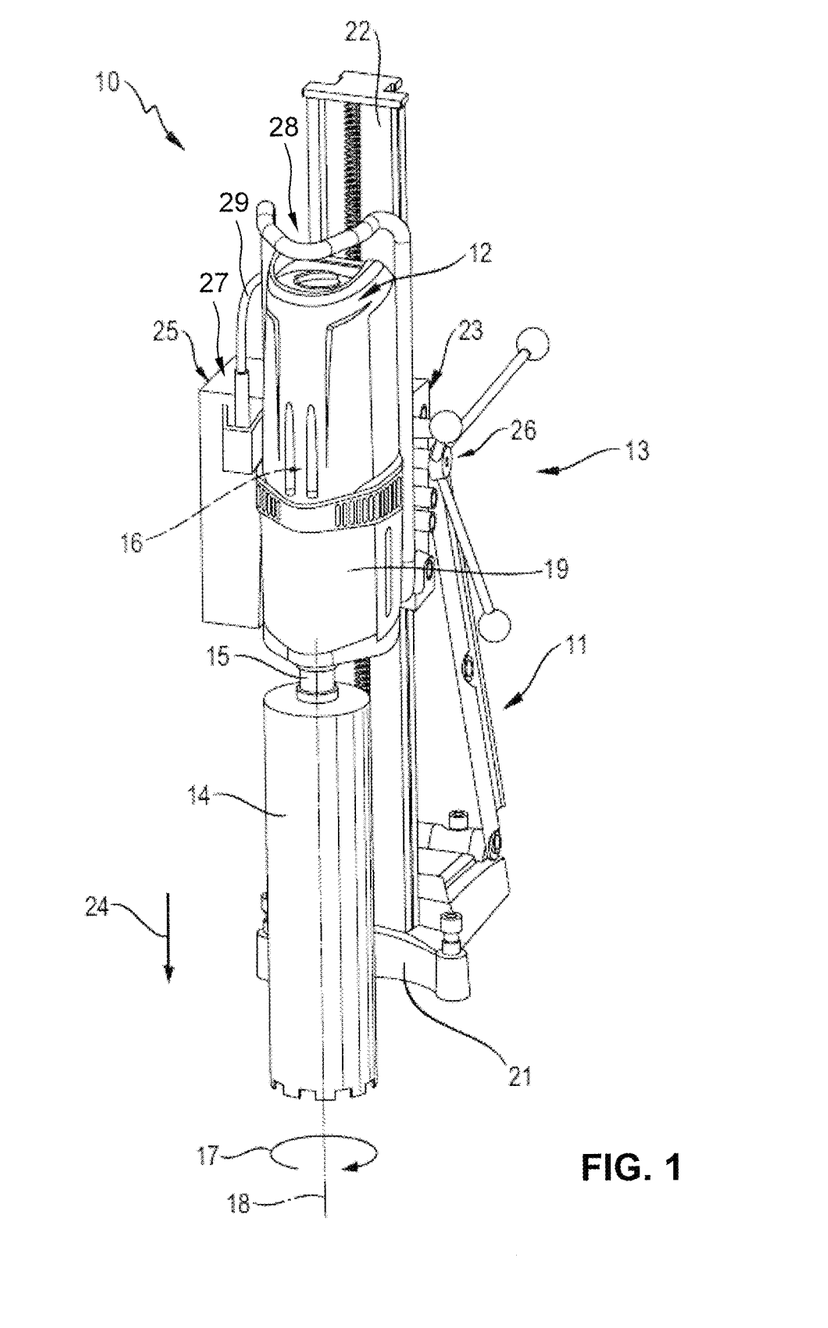
FIG. 1 depicts a device system having a device stand, a core bore device, and a motorized advancing apparatus for moving the core bore device along the device stand in a three-dimensional representation.

FIG. 1 shows a stand-guided device system 10 consisting of a device stand 11, a tool device 12 arranged movably on the device stand 11, and an advancing apparatus 13 for moving the tool device 12 along the device stand 11 in a three-dimensional representation.

The tool device is formed as a core bore device 12 and includes a machining tool formed as a bore bit 14 that is arranged on a driveshaft 15 and is driven by a drive apparatus 16 in a rotational direction 17 around an axis of rotation 18. All drive components for the bore bit 14, with the exception of the driveshaft 15, are re-subsumed under the term "drive apparatus." The drive apparatus 16 represented schematically in FIG. 1 is arranged in a device housing 19 and includes a bore motor and electronics apparatus. The bore bit 14 is mounted in a torque-proof way on the driveshaft 15 and the driveshaft 15 is driven by the bore motor around the axis of rotation 18. One or more gear mechanism components can be interposed between the bore motor and the driveshaft 15.

The device stand 11 consists of a ground plate 21, which is fastened to a substrate, and a guiding track 22, which is connected to the ground plate 21. The core bore device 12 is arranged over a guiding carriage 23 on the device stand 11 and is movable by way of the advancing apparatus 13 along the guiding track 22 in an advancing direction 24 that runs parallel to the axis of rotation 18. The advancing apparatus 13 includes a motorized advancing apparatus 25 and a manual advancing apparatus 26 formed as a hand wheel. The core bore device 12 can optionally be run with the motorized advancing apparatus 25 or manual advancing apparatus 26 along the guiding track 22 of the device stand 11. The device system 10 is operated via a first operating unit 27 attached to the motorized advancing apparatus 25 and a second operating unit 28 attached to the core bore device 12. The motorized advancing apparatus 25 is connected to the core bore device 12 via a communication cable 29.

The first operating unit 27 includes, for example, multiple operating buttons, a display, and an emergency shutoff switch, and the second operating unit 28 can be formed as a rotary selector. Alternatively or additionally, a remote control unit can be provided that is connected via communication connections to a control unit of the core bore device 12 and/or a control unit of the motorized advancing apparatus 25. The communication connections can be formed as wireless communication connections in the form of infrared, Bluetooth, WLAN, or Wi-Fi connections or as cabled communication connections. In addition to the listed wireless connection technologies, all previously known and future wireless connection technologies are suitable for data transmission.

Figure 2:
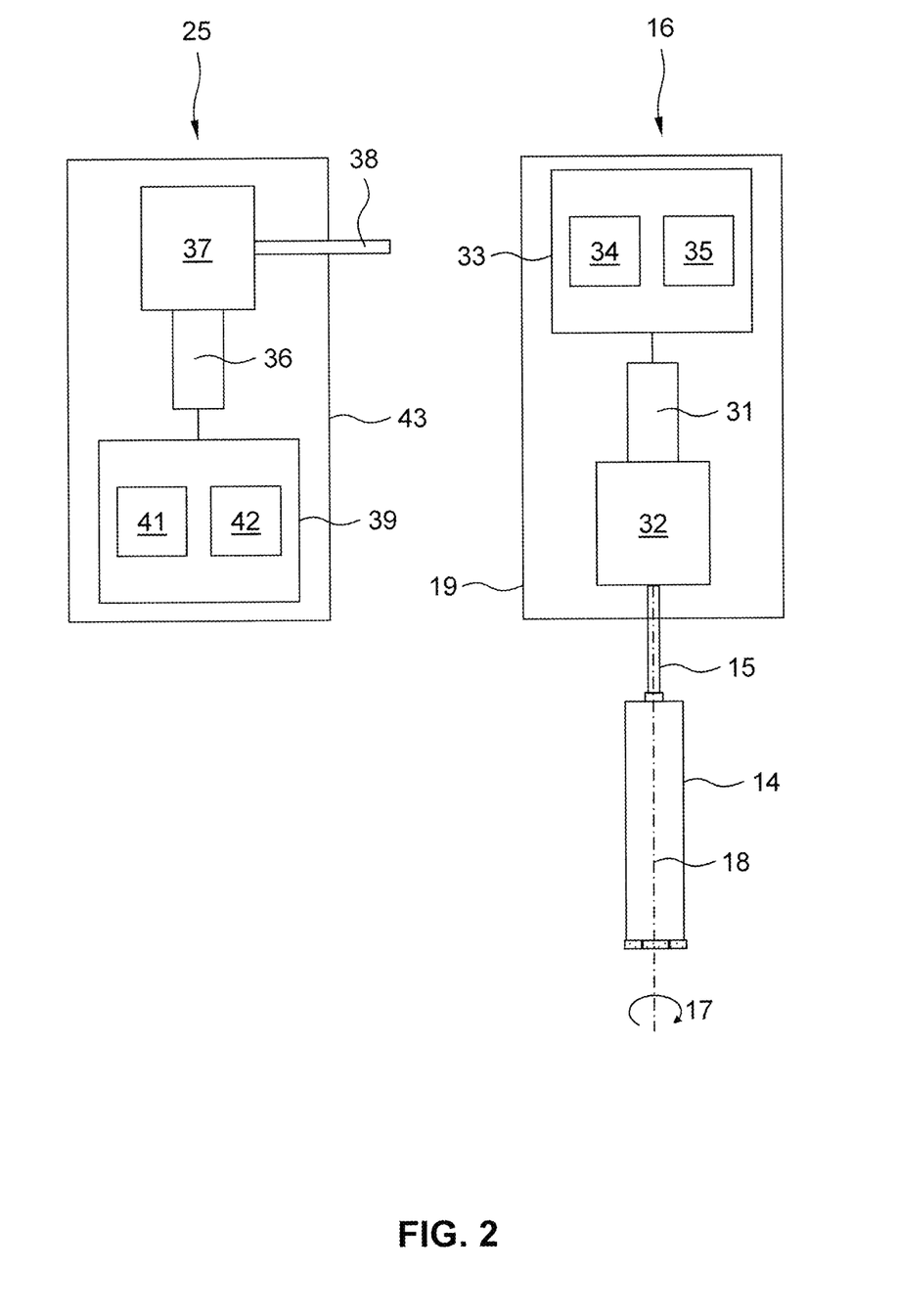
FIG. 2 depicts the motorized advancing apparatus and a drive apparatus of the core bore device of FIG. 1 in a schematic representation.

FIG. 2 shows the setup of the drive apparatus 16 and the motorized advancing apparatus 25 in a schematic representation. The bore bit 14 is mounted in a torque-free way on the driveshaft 15 and is driven by the drive apparatus 16 around the axis of rotation 18. The motorized advancing apparatus 25 drives the core bore device 12 in the advancing apparatus 24 along the guiding track 22.

The drive apparatus 16 includes a bore motor 31, a gear mechanism apparatus 32, and electronics apparatus 33 having a power electronics unit 34 and a control unit 35 for controlling and regulating the core bore device 12. The driveshaft 15 is driven by the bore motor 31 and the gear mechanism apparatus 32 around the axis of rotation 18, whereby the gear mechanism apparatus 32 is arranged between the bore motor 31 and the driveshaft 15. The bore motor 31, the gear mechanism apparatus 32, and the electronics apparatus 33 are arranged in the device housing 19 of the core bore device 12.

The motorized advancing apparatus 25 includes an advancing motor 36, a gear mechanism apparatus 37, a driveshaft 38, and an electronics apparatus 39 having a power electronics unit 41 and a control unit 42 for controlling and regulating the motorized advancing apparatus 25. The advancing motor 36, the gear mechanism apparatus 37, and the electronics apparatus 39 are arranged in a housing 43. The first operating unit 27 is integrated into the top of the housing 43.

Control and regulation of the core bore process take place by way of the control units 35, 42. The goal of the control and regulating process for core boring is to optimally use the available power of the device system 10 and at the same time not to reduce the service life of the bore bit 14 and the drive apparatus 16. In addition, inexperienced users are to be enabled to achieve optimal machining results (quality, time, etc.). The machining and regulating parameters by which optimal machining results are achieved primarily depend on the diameter of the bore bit 14 and the material to be machined. Concrete and steel in the form of concrete reinforcing bars are especially relevant as materials for core boring. In addition, boring requires adjusted machining and regulating parameters.

In the control unit 42 of the motorized advancing apparatus 25, lookup tables are stored that include optimized machining and regulating parameters for core boring. For every bore bit diameter, multiple parameter sets are stored. The parameter sets include the know-how for the machining process and take into account the various basic conditions for tapping, boring of concrete (concrete boring), and for boring of concrete reinforcing bars (iron bores). If additional materials are to be machined, appropriate parameter sets with optimized machining and regulating parameters for the additional materials can be stored in the lookup tables.

Figure 3:
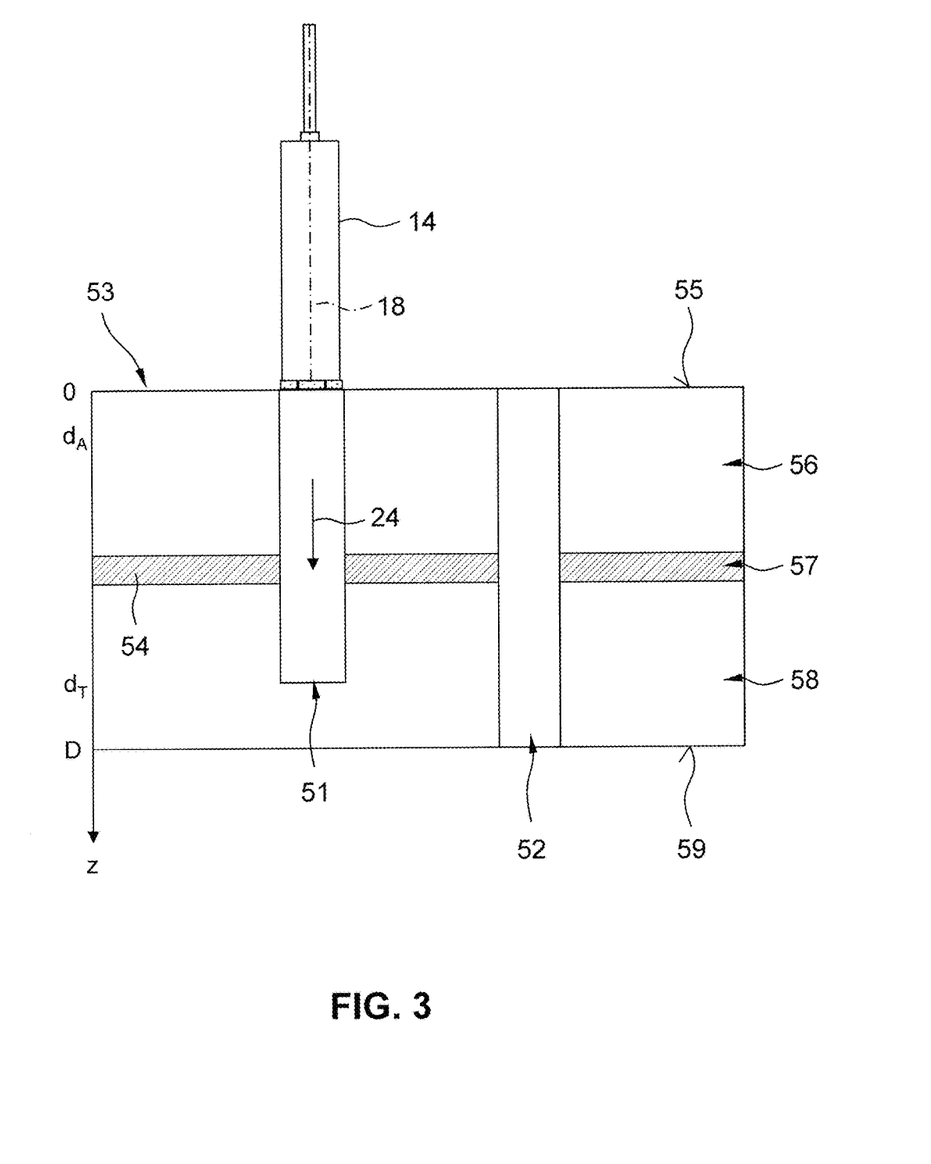
FIG. 3 depicts the application of the device system of FIG. 1 when creating a blind bore and a through bore in a concrete ceiling with embedded reinforcing bars in a schematic representation.

FIG. 3 shows the application of the device system 10 of FIG. 1 when creating a blind bore 51 and a through bore 52 in a reinforced concrete ceiling 53 in which the reinforcing bars 54 are embedded. The reinforced concrete ceiling 53 in FIG. 3 in a z direction corresponding to the advancing direction 24 consists of a top 55, a first concrete area 56, and an iron area 57, a second concrete area 58, and a bottom 59. The blind bore 51 exhibits a bore depth $d_T$ and the bore depth of the through bore 52 corresponds to the thickness D of the reinforced concrete ceiling 53. The top 55 of the reinforced concrete ceiling 53 is defined as zero position z=0 and all depth measurements in the z direction refer to the top 55 as zero position.

The method for controlling the device system 10 when creating the through bore 52 in the reinforced concrete ceiling 53 can be subdivided into six phases: (1) detection of the top 55, (2) tapping, (3) concrete boring of the first concrete area 56, (4) iron boring of the iron area 57, (5) concrete boring of the second concrete area 58, and (6) breaking through the bottom 59. With respect to the blind bore 51, which in of FIG. 3 ends in the second concrete area 58, the first to fifth phases are carried out analogously to the through bore 52, whereby the fifth phase ends when the bore depth $d^T$ is reached, the sixth phase is dropped. If the blind bore 51 already ends in the first concrete area 56, the control method exhibits only the first to third phases.

The first phase is referred to as surface detection. Here, a manual example and an automatic example of the surface detection can be distinguished. In the manual example, the core bore device 12 is driven by the operator with the assistance of the hand wheel 26 into the position in which the bore bit 14 touches the surface 55 of the reinforced concrete ceiling 53, the operator confirms via the operating unit 27 at the motorized advancing apparatus 25 that the bore bit 14 touches the surface 55 of the reinforced concrete ceiling 53, and the control unit 42 stores this position of the bore bit 14 as zero position z=0.

In the automatic example, the reaching of the surface 55 can be detected, for example, with the assistance of the advancing speed of the bore bit 14. At the advancing motor 36, a constant rotational speed is set that is converted to a constant advancing speed over the guiding carriage 23 of the bore bit 14, which is referred to as the target speed $v_{target}$. When the bore bit 14 touches the top 54, the bore bit 14 is slowed down and there is a rapid decline in, the advancing speed. The current advancing speed $v_{actual}$ of the bore bit 14 can be recorded with the assistance of a sensor apparatus. The difference between the current advancing speed $v_{actual}$ of the bore bit 14 and the target speed $v_{target}$ is calculated and compared with a preset value. If the difference exceeds the preset value, the position of the bore bit 14 is stored in the control unit 42 as zero position z=0.

As soon as the zero position of the bore bit 14 is stored, the first phase is ended and the second phase begins. The second phase is referred to as tapping. To avoid polishing the bore bit 14, the motor output and advancing speed are initially reduced for core boring. When the cutting segments of the bore bit 14 have pierced the surface 55 and are located in the first concrete area 56, the bore bit 14 is guided and polishing of the bore bit 14 is avoided. To securely prevent polishing, the second phase of the tapping is executed via a tapping depth $d_A$.

The machining parameters for the device mode "tapping" are reduced compared to the device mode "concrete boring." The tapping depth $d_A$ and the machining parameters suitable for tapping are stored in the control unit 42. In practice, a tapping depth $d_A$ of 2 mm has proved to be suitable. As a matter of principle, the tapping depth $d_A$ should be selected so that the tapping phase is ended at the depth of the reinforcing bars 54. For manual surface detection, the second phase must be started by the operator manually, whereas the second phase for automatic surface detection can also be started automatically by the device system 10.

As soon as the bore bit 14 has reached the tapping depth $d_A$, the second phase of tapping is ended and the third phase begins. The third phase is referred to as concrete boring of the first concrete area 56. The device system 10 is switched from the device mode "tapping" to the device mode "concrete boring." The machining parameters for the core bore device 12 and the motorized advancing apparatus 25 are adjusted to the boring of concrete. The reinforcing bars 54 are arranged at least 40 mm below the top 55 of the reinforced concrete ceiling 53 and the tapping depth $d_A$ is less than the distance between the top 55 and the reinforcing bars 54, so that, as a matter of principle, the concrete boring phase follows tapping.

Once the bore bit 14 touches a reinforcing bar 54, the third phase is ended and the fourth phase begins. The fourth phase is referred to as iron boring of the iron area 57. The device system 10 is switched from the device mode "concrete boring" to the device mode "iron boring." The machining parameters for the core bore device 12 and the motorized advancing apparatus 25 are adjusted to the boring of concrete reinforcing bars.

Once the bore bit 14 touches the second concrete area 58, the fourth phase is ended and the fifth phase begins. The fifth phase is referred to as concrete boring of the second concrete area 58. The device system 10 is switched from the device mode "iron boring" to the device mode "concrete boring." The machining parameters for the core bore device 12 and the motorized advancing apparatus 25 correspond to the machining parameters of the third phase.

Once the bore bit 14 has bored through the second concrete area 58, the fifth phase is ended and the sixth and final phase of the control method according to the invention begins. The sixth phase is referred to as breaking through the bottom 59. The through bore 52 is made in the reinforced concrete ceiling 53 when the bore bit 14 has reached the bottom of the reinforced concrete ceiling 53.

In order to be able to automatically control the device system 10 with the core bore device 12 and the motorized advancing apparatus 25, the device system 10 must recognize whether the bore bit 10 bores concrete or machines a reinforcing bar 54. The decision of whether the bore bit 14 will bore in a concrete area 56, 58 or will impinge on a reinforcing bar 54 in the iron area 57 is made with the assistance of a bore progress v with respect to the method according to the invention for controlling the device system 10. As bore progress v, a quotient consisting of a path difference $\Delta z$ and a time difference $\Delta t$ is defined that therefore represents a speed. The bore progress v can be calculated in that at the start and at the end of a fixed time interval $\Delta t$ the positions $z_1$, $z_2$ of the bore bit 14 are measured. Alternatively, the necessary time $\Delta t = t_2 - t_1$ can be measured for preset positions $z_1$, $z_2$ with $\Delta z = z_2 - z_1$ of the bore bit 14.

After switching the device system 10 from the second to the third phase, a first bore progress is calculated which is defined as the reference value $v_{ref}$ for the concrete boring as part of the control method. All other bore progresses that are calculated during the method are compared with the reference value $v_{ref}$. Because the tapping depth $d_A$ has been selected so that the phase of tapping is ended in any case at the depth of the reinforcing rods 54, this ensures that concrete will be machined after tapping.

As long as the bore bit 14 machines the first concrete area 56, the deviations of the bore progress $v_{current}$ from the reference value $v_{ref}$ are less than approximately +/−20%*$v_{ref}$. One of the reasons for the deviations from the reference value $v_{ref}$ is irregularities in the concrete. As soon as the bore bit 14 is no longer boring in the first concrete area 56, but rather impinging on the reinforcing bar 54 in the iron area 57, there is a clear drop-off in the current bore progress $v_{current}$. This dramatic change in the bore progress is used to switch to the fourth phase, iron boring of the iron area 57. To that end, the current bore progress $v_{current}$ is specified and compared with a preset first threshold value $G_1$. The first threshold value $G_1$ corresponds to a percentage of the reference value $v_{ref}$ and is 40% of the reference value $v_{ref}$, for instance. The bore bit 14 machines concrete as long as the current bore progress $v_{current}$ is not less than the first threshold value $G_1$ ($v_{current} \geq G_1$). If the current bore progress $v_{current}$ is less than the first threshold value $G_1$ ($v_{current} < G_1$), concrete is not machined, but rather the second material different from the concrete, in FIG. 3, the iron of the reinforcing rods 54.

During the "iron boring" phase, the machining parameters of the device system 10 are adapted to the boring of the reinforcing rod 54. As soon as the boring bit 14 no longer machines the reinforcing rod 54, but rather machines the concrete in the second concrete area 58, there is a clear increase in the current bore progress $v_{current}$. This dramatic change in the bore progress is used to switch to the fifth phase, the concrete boring of the second concrete area 58. To that end, the current bore progress $v_{current}$ is specified and compared with a preset second threshold value $G_2$. The second threshold value $G_2$ corresponds to a percentage of the reference value $v_{ref}$ and is 60% of the reference value $v_{ref}$, for example. The bore bit 14 machines the iron area 57 as long as the current bore progress $v_{current}$ is less than the second threshold value $G_2$ ($v_{current} < G_2$). If the current bore progress $v_{current}$ exceeds the second threshold value $G_2$, ($v_{current} \geq G_2$), the bore bit 14 has left the iron area 57 and machines the second concrete area 58. The first and second threshold values $G_1$, $G_2$ are determined by the operator before starting the core bore process and are stored in the lookup tables of the control unit 42.

The end of the core bore with respect to the through bore 52 can likewise be monitored with the help of the current bore progress $v_{current}$ and of the reference value $v_{ref}$. If the bore bit 14 has completely bored through the second concrete area 58, then the bottom 59 of the reinforced concrete ceiling 53 is penetrated. The bore bit 14 does not experience any resistance and there is a dramatic increase in the current bore progress $v_{current}$. This dramatic change of the bore progress can be used to switch off the device system 10. To that end, the current bore progress $v_{current}$ is compared with a preset third threshold value $G_3$. The third threshold value $G_3$ corresponds to a percentage of the reference value $v_{ref}$ and is 250% of the reference value $v_{ref}$, for example. An increase of the bore progress of more than 150% of the reference value $v_{ref}$ can only occur if the reinforced concrete ceiling 53 has been penetrated at the bottom 59.

Figure 4:
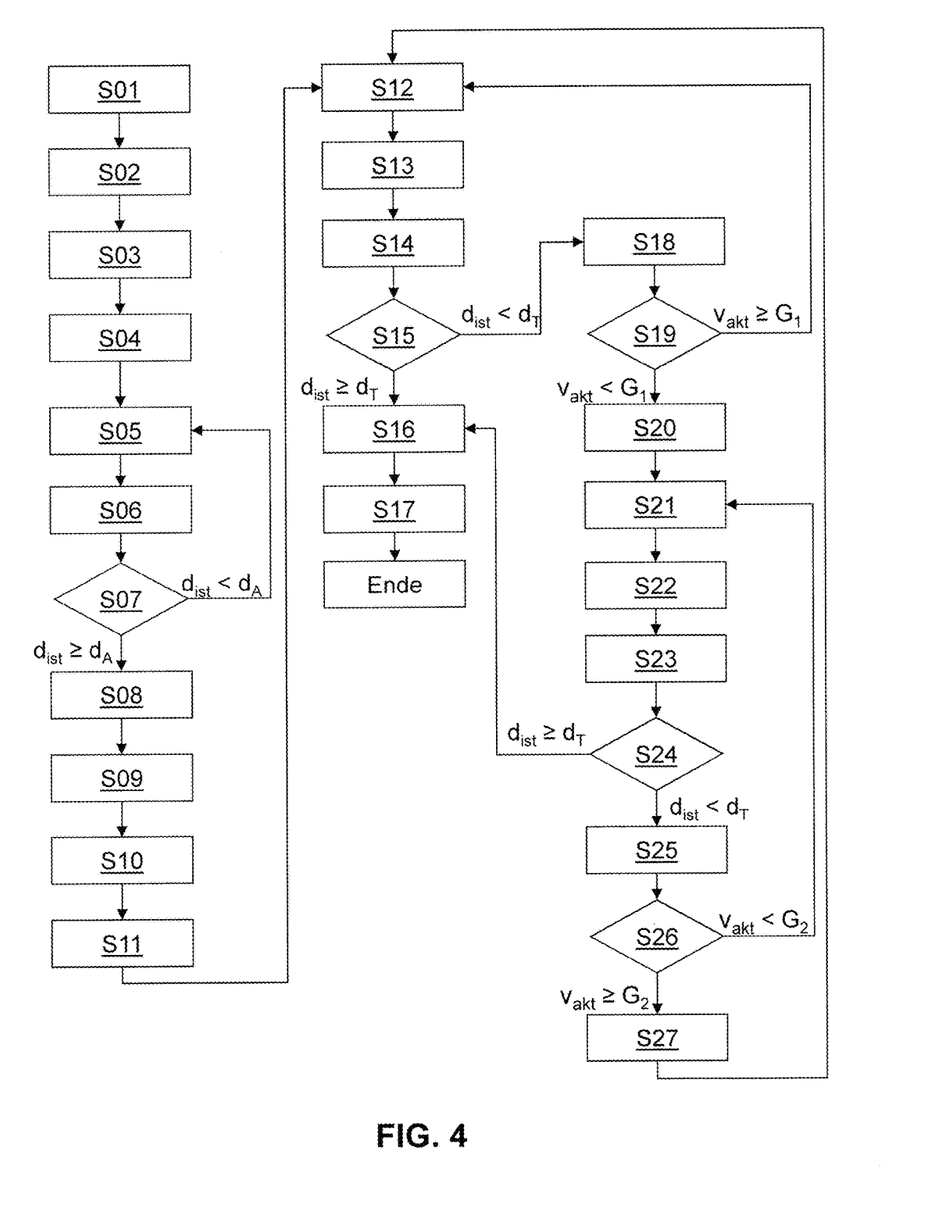
FIG. 4 depicts a first embodiment of a method according to the invention for controlling the device system shown in FIG. 1 when creating a blind bore in the concrete ceiling of FIG. 3 in the form of a flowchart.

FIG. 4 shows a first embodiment of a method according to the invention for controlling a device system when creating a blind bore in the form of a flowchart. The control method is described by way of the device system 10 shown in FIG. 1 having the core bore device 12 and the motorized advancing apparatus 25. With the help of the device system 10, the blind bore 51 is created in the reinforced concrete ceiling 53 of FIG. 3.

In a step S01 the operator sets the diameter of the bore bit 14 via the rotary selector 28 and the geometry of the bore hole via the first operating unit 27 (blind bore 51 with bore hole depth $d_T$).

Alternatively, the diameter of the bore bit 14 likewise can be entered via the first operating unit 27. In a step S02, the operator drives the bore bit 14 into the zero position and stores the zero position at the first operating unit 27. Then, the operator starts the method in a step S03 via the first operating unit 27.

The control unit 42 sets the machining parameters in a step S04 at the advancing motor 36 and via the control unit 35 at the bore motor 31, which are stored in the lookup tables for tapping (second phase). For each bore bit diameter, multiple parameter sets are stored in the control unit 42 with suitable machining parameters for tapping, boring of concrete (concrete boring), and the boring of concrete reinforcing bars (iron boring). Before starting the method, the bore motor 31 and the advancing motor 36 are switched off. The core bore device 12 and the motorized advancing apparatus 25 are switched on in a step S05 and are operated with the machining parameters set in step S04 for tapping.

The control unit 42 in a step S06 measures the current bore depth $d_{actual}$ by way of a suitable sensor unit and in a step S07 checks whether the preset tapping depth $d_A$ is reached. The current bore depth $d_{actual}$ is measured at a preset time interval. If the current bore depth is below the preset tapping depth ($d_{actual} < d_A$ in S07), the method is continued with step S05. If the preset tapping depth $d_A$ is reached ($d_{actual} \geq d_A$ in S07), the tapping phase is ended. Steps S04 to S07 are referred to as tapping phase $T_1$.

When the tapping phase $T_1$ is ended, the control unit 42 in a step S08 at the advancing motor 36 and via the control unit 35 at the bore motor 31 sets machining parameters that are stored in the lookup tables of the control unit 42 for the bore bit diameter for concrete boring. The core bore device 12 and the motorized advancing apparatus 25 are operated in a step S09 with the set machining parameters for the concrete boring.

In a step S10, the position z of the bore bit 14 in a preset time interval is measured by a path sensor or a comparable sensor and transmitted to the control unit 42. The control unit 42 calculates in a step S11 the first bore progress from the measurement values and stores the first bore progress as a reference value $v_{ref}$. The core bore device 12 and the motorized advancing apparatus 25 are operated in a step S12 with the machining parameters for concrete boring. The current position of the bore bit 14 is measured in a step S13 and transmitted to the control unit 42 of the motorized advancing apparatus 25.

The control unit 42 calculates in a step S14 from the position of the bore bit 14 the current bore depth $d_{actual}$ and compares the current bore depth $d_{actual}$ in a step S15 with the set bore hole depth $d_T$ of the blind bore 51. If the preset bore hole depth $d_T$ is reached ($d_{actual} \geq d_T$ in S15), the core bore is ended. Then, the bore bit 14 must be removed from the reinforced concrete ceiling 53 whereby this step can be manually carried out by the operator or automatically by the device system 10. In the automatic example, the control unit 42 switches the core bore device 12 and the motorized advancing apparatus 25 in a step S16 to a parking mode. Machining parameters appropriate to the parking mode for the core bore device 12 and the motorized advancing apparatus 25 are stored in the control unit 42. The core bore device 12 and the motor advancing apparatus 25 are operated in a step S17 with the set machining parameters until the core bore device 12 has reached a preset parking position. The parking position can be defined, for example, as a zero position with an additional offset of 10 cm above the surface 55. The method according to the invention is ended after step S17.

If the current bore depth $d_{actual}$ is less than the preset bore hole depth $d_T$ ($d_{actual} < d_T$ in S15), the core bore is continued. The control unit 42 calculates in a step S18 from the measurement values transmitted in step S13 the current bore progress $v_{current}$ and compares the current bore progress $v_{current}$ in a step S19 with the preset first threshold value $G_1$. If the current bore progress $v_{current}$ is not less than the first threshold value $G_1$ ($v_{current} \geq G_1$ in S19), the core bore device 12 and the motorized advancing apparatus 25 are further operated in the "concrete boring" phase and the method according to the invention is continued with step S12. The current position of the bore bit 14 is measured with a frequency.

If the current bore progress $v_{current}$ exceeds the first threshold value $G_1$ ($v_{current} < G_1$ in S19), the control unit 42 in a step S20 switches the advancing motor 36 and via the control unit 35 the bore motor 31 from the "concrete boring" phase to the "iron boring" phase. To that end, the control unit 42 at the advancing motor 36 and at the bore motor 31 sets the machining parameters, which are stored in the lookup tables of the control unit 42 for the "iron boring" phase. The core bore device 12 and the motorized advancing apparatus 25 are operated in a step S21 with the set machining parameters for the iron boring.

The current position z of the bore bit 14 is measured in a step S22 at the distance of time interval $\Delta t$ and transmitted to the control unit 42 of the motorized advancing apparatus 25. The control unit 42 calculates in a step S23 from the current position of the bore bit 14 the current bore depth $d_{actual}$ and compares the current bore depth $d_{actual}$ in a step S24 with the bore hole depth $d_T$. If the preset bore hole depth $d_T$ is reached ($d_{actual} \geq d_T$ in S24), the core bore is ended and the method is continued with step S16. If the current bore depth $d_{actual}$ is less than the preset bore hole depth $d_T$ ($d_{actual} < d_T$ in S24), the core bore is continued and the control unit 42 calculates in a step S25 from the measurement values the current bore progress $v_{current}$.

In a step S26, the current bore progress $v_{current}$ is compared with the preset, second threshold value $G_2$. If the current bore progress $v_{current}$ is less than the second threshold value $G_2$ ($v_{current} < G_2$ in S26), the core bore device 12 and the advancing module 26 are further operated in the "iron boring" phase and the method is continued with step S21. If the current bore progress $v_{current}$ is not less than the second threshold value $G_2$ ($v_{current} \geq G_2$ in S26), the control unit 42 in a step S27 switches from the "iron boring" phase to the "concrete boring" phase. The core bore device 12 and the motorized advancing apparatus 25 are operated with the machining parameters, which are stored in the lookup tables of the control unit 42 for the "concrete boring" phase. The method is continued with step S12.

Figure 5:
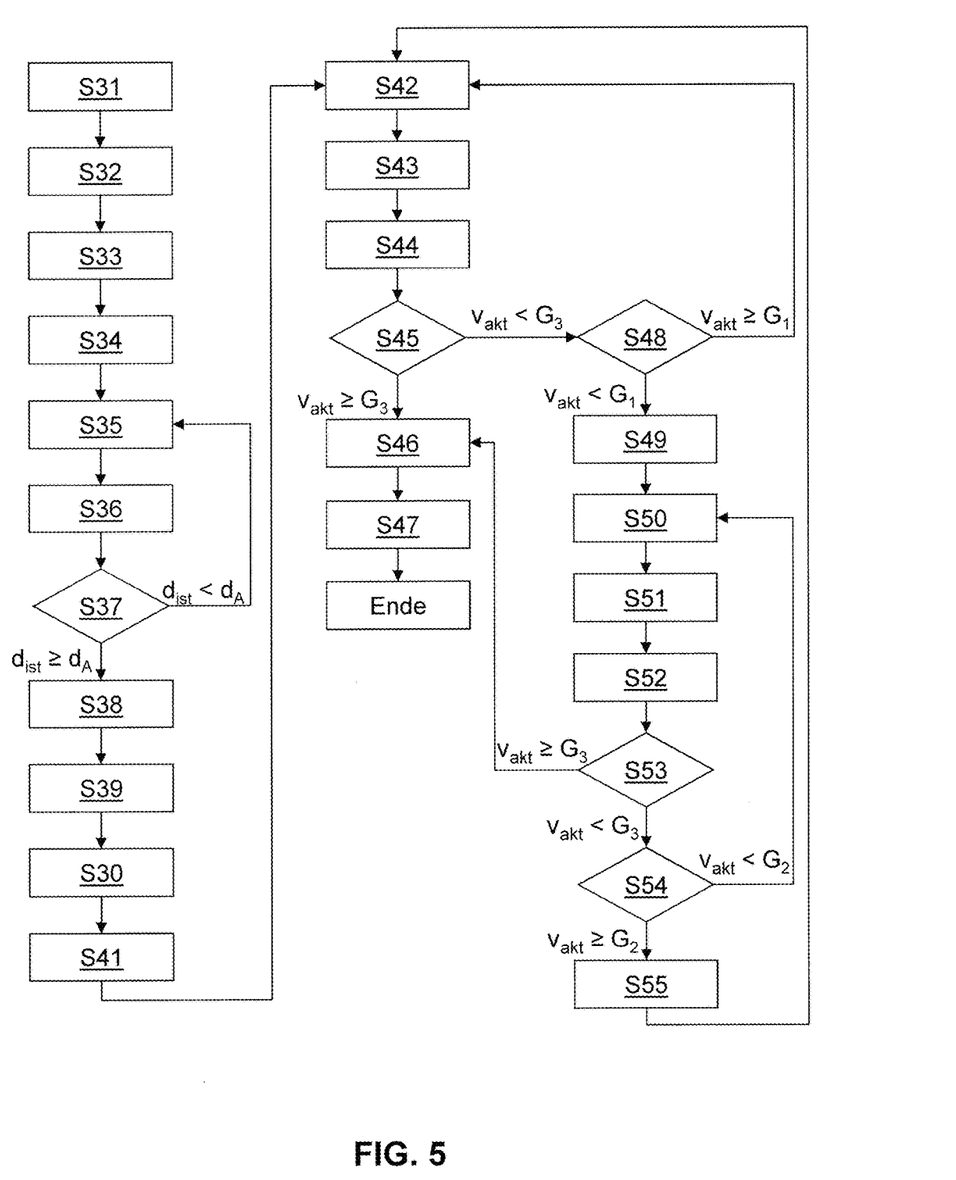
FIG. 5 depicts a second embodiment of a method according to the invention for controlling the device system shown in FIG. 1 when creating a through bore in the concrete ceiling of FIG. 3 in the form of a flowchart.

FIG. 5 shows a second embodiment of a method according to the invention for controlling a device system with respect to creating a through bore in the form of a flowchart. The control method is described by way of the device system 10 shown in FIG. 1 with the core bore device 12 and the motorized advancing apparatus 25. The through bore 52 is created in the reinforced concrete ceiling 53 of FIG. 3 with the assistance of the device system 10.

With respect to the control method according to the invention based on FIG. 5, steps S31 to S43 are executed which match the steps S01 to S13 of the control method shown in FIG. 4. The control unit 42 calculates in a step S44 from the measurement values transmitted in step S43 the current bore progress $v_{current}$ and compares in a step S45 the current bore progress $v_{current}$ with the preset, third threshold value $G_3$.

If the current bore progress $v_{current}$ exceeds the third threshold value $G_3$ ($v_{current} \geq G_3$ in S45), the bore bit 14 has reached the bottom 59 of the reinforced concrete ceiling 53. The control unit 42 switches the core bore device 12 and the motorized advancing apparatus 25 in a step S46 to the parking mode. Appropriate machining parameters for the parking mode of the device system 10 are stored in the control unit 42. The device system 10 is operated in a step S47 with the set machining parameters for the parking mode until the core bore device 12 has reached the preset parked position. The method according to the invention is ended after step S47.

If the current bore progress $v_{current}$ is less than the third threshold value $G_3$ ($v_{current} < G_3$ in S45), then the current bore progress $v_{current}$ is compared by the control unit 42 in a step S48 with the first threshold value $G_1$. If the current bore progress $v_{current}$ is not less than the first threshold value $G_1$ ($v_{current} \geq G_1$ in S48), the device system 10 is further operated in the "concrete boring" phase and the method according to the invention is continued with step S42. If the current bore progress $v_{current}$ is less than the first threshold value $G_1$ ($v_{current} < G_1$ in S48), the device system 10 in a step S49 is switched to the "iron boring" phase, and the method according to the invention is continued with steps S50 and S51 which match the steps S21 and S22.

In a step S52, the control unit 42 calculates from the measurement values transmitted in step S51 the current bore progress $v_{current}$ and compares the current bore progress $v_{current}$ in a step S53 with the preset third threshold value $G_3$.

If the current bore progress $v_{current}$ exceeds the third threshold value $G_3$ ($v_{current} \geq G_3$ in S53), the bore bit 14 has reached the bottom 59 of the reinforced concrete ceiling 53. The method according to the invention is continued with steps S46 to S47 and is ended after step S47.

If the current bore progress $v_{current}$ exceeds the third threshold value $G_3$ ($v_{current} < G_3$ in S53), then the current bore progress $v_{current}$ is compared by the control unit 42 in a step S54 with the second threshold value $G_2$. If the current bore progress $v_{current}$ is less than the second threshold value $G_2$ ($v_{current} < G_2$ in S54), the device system 10 is further operated in the "iron boring" phase and the method is continued with step S50. If the current bore progress $v_{current}$ exceeds the second threshold value $G_2$ ($v_{current} \geq$ in S54), the control unit 42 switches the device system 10 in a step S55 from the "iron boring" phase to the "concrete boring" phase and the method according to the invention is subsequently continued with step S42.

In addition to the machining parameters for the three phases "tapping," "concrete boring," and "iron boring," regulation parameters adjusted for each bore bit diameter for regulating the motor parameters in the "concrete boring" and "iron boring" phases can be stored in the lookup tables of the control unit 42. During machining, the current motor parameters (rotational speed, torque) of the bore motor 31 are measured and transmitted to the control unit 42 of the motorized advancing apparatus 25. The control unit 42 calculates from the transmitted measurement values a deviation $\Delta$ between the current motor parameters (actual values) and the motor parameters stored in the control unit 42 (target values). The calculated deviation $\Delta$ is compared with a preset maximum deviation $\Delta_{max}$. If the deviation $\Delta$ is less than the maximum deviation ($\Delta < \Delta_{max}$), the motor parameters at the advancing motor 36 and at the bore motor 31 remain unchanged and the advancing motor 36 is operated with the current motor parameters. If the deviation $\Delta$ exceeds the maximum deviation ($\Delta \geq \Delta_{max}$), the control unit 42 calculates adjusted motor parameters for the advancing motor 36 and the bore motor 31 and sets these adjusted motor parameters at the motors 36, 31.

The invention claimed is:

1. A method for controlling a device system, wherein the device system comprises a tool device and a motorized advancing apparatus during the machining of a workpiece composed of a first material and a second material different from the first material, the method comprising the steps of:
   machining the workpiece by the device system initially in a first operating mode with first machining parameters that are stored for the first material;
   measuring a first machining progress of the tool device as a quotient of a path difference and a time difference and storing the first machining progress as a reference value after the start of the machining of the workpiece in the first operating mode; and
   measuring regularly and comparing with a first threshold value, which is a percentage of the reference value, a current machining progress of the tool device during machining of the workpiece in the first operating mode;
   wherein the workpiece is machined by the device system in the first operating mode when the current machining progress is within the first threshold value.

2. The method according to claim 1, further comprising switching the device system from the first operating mode to a second operating mode when the current machining progress is outside the first threshold value, and wherein the workpiece is machined by the device system in the second operating mode with second machining parameters that are stored for the second material.

3. The method according to claim 2, further comprising measuring regularly and comparing with a second threshold value the current machining progress of the tool device during the machining of the workpiece in the second operating mode.

4. The method according to claim 3, wherein the workpiece is machined by the device system in the second operating mode when the current machining progress is within the second threshold value.

5. The method according to claim 3, further comprising switching the device system from the second operating mode to the first operating mode when the current machining progress is outside the second threshold value, and
wherein the workpiece is machined by the device system in the first operating mode with the first machining parameters that are stored for the first material.

\* \* \* \* \*